United States Patent
Tong

(10) Patent No.: US 6,488,997 B1
(45) Date of Patent: Dec. 3, 2002

(54) DEGRADABLE COMPOSITE MATERIAL, ITS DISPOSABLE PRODUCTS AND PROCESSING METHOD THEREOF

(75) Inventor: Wang You Tong, Jiangxi (CN)

(73) Assignee: Enviro Concept Ltd., Valletta (MT)

( * ) Notice: Subject to any disclaimer, the term of this patent is extended or adjusted under 35 U.S.C. 154(b) by 0 days.

(21) Appl. No.: 09/540,483

(22) Filed: Mar. 31, 2000

(51) Int. Cl.7 .................................................. C08K 5/21
(52) U.S. Cl. ................ 428/35.7; 428/292.4; 428/295.1; 428/296.7; 428/297.4; 428/524; 428/532; 428/903.3; 428/537.1; 523/124
(58) Field of Search ................................ 428/35.7, 524, 428/532, 537.1, 903.3, 292.4, 295.1, 296.7, 297.4; 523/124

(56) References Cited

U.S. PATENT DOCUMENTS

| | | | | |
|---|---|---|---|---|
| 5,354,621 A | * | 10/1994 | Liebermann | 428/532 |
| 5,635,123 A | * | 6/1997 | Riebel et al. | 264/125 |
| 5,705,239 A | * | 1/1998 | Andersen et al. | 428/34.5 |
| 5,939,192 A | * | 8/1999 | Rettenbacher et al. | 428/401 |
| 6,013,774 A | * | 1/2000 | Meister et al. | 503/507 |
| 6,103,377 A | * | 8/2000 | Clausi | 428/397 |
| 6,114,416 A | * | 9/2000 | Kolla et al. | 524/9 |
| 6,280,667 B1 | * | 8/2001 | Koenig et al. | 264/68 |
| 2001/0027225 A1 | * | 10/2001 | Downie | 523/124 |

\* cited by examiner

*Primary Examiner*—Bruce H. Hess
*Assistant Examiner*—Dawn Garrett
(74) *Attorney, Agent, or Firm*—Davis Wright Tremaine LLP

(57) ABSTRACT

There is disclosed a kind degradable material and its disposable products, and their manufacturing process. The primary raw material used in the process consists of powdered shell or stalk of crops, urea-formaldehyde resin, and melamine resin. The materials are mixed thoroughly and hot pressed in a single step forming of the products. Oven drying or spray coating is not needed in the process. The products have the following characteristics: simple formula, simple process, low price; and the following properties: with natural color, dense; tough and tensile; and easy for coloring. In addition, they are water, heat and freezing resistant, anti-corrosion, non-poisonous, anti-pollution and biodegradable. They are entirely new environmental protection green products.

13 Claims, No Drawings

DEGRADABLE COMPOSITE MATERIAL, ITS DISPOSABLE PRODUCTS AND PROCESSING METHOD THEREOF

TECHNICAL FIELD

This invention relates to a kind of degradable material, its disposable products and processing method thereof.

BACKGROUND OF THE INVENTION

Currently, disposable tableware products made of plastic foam and plastics have the following defects:
(1) Large consumption of petroleum resources;
(2) Freon used in the foaming process destroys the ozone layer of atmosphere;
(3) Inability to decay even if buried underground for 200 years, causing serious white pollution, etc.

At present, disposable tableware products substituted by paper or starch materials have the following shortcomings: paper materials consume a large amount of bamboo and wood, thus damaging green resources in addition to causing water pollution by the pulp and paper production process, while substitutes by starch material consume huge quantity of grains, and are susceptible to mildew. Apparently, such substitutes still have technical problems as well as environmental problems that need to be addressed.

Most of the published patents for utilization of shell or stalk of crops as raw materials to make disposable tableware products use wet and cold pressing processes, requiring low temperature heating, long time drying and repeated coating, and, thus, resulting in multiple steps in operation, complicated processes, large amount of investment, high cost of the products, and difficulties in their promotion and popularization. A small portion of the said published patents use dry and hot pressing process, but the organic high molecular polymer used as adhesives is expensive, and some of the adhesives do not meet sanitary standards. Although the processes are simple, but the costs of the products cannot be reduced to a level acceptable in the markets.

SUMMARY OF THE INVENTION

In view of the defects and shortcomings of the above-stated processes for producing disposable tableware products by using shell or stalks of crops as raw materials, one object of the present invention is to provide a degradable composite material.

Another object of the present invention is to provide an application of the degradable composite material in manufacturing of disposable tableware.

The further object of the present invention is to provide a molding process method using the degradable composite material in the manufacturing of disposable tableware.

The degradable composite material of the invention comprises the following components by weight and in parts:

| | |
|---|---|
| plant fiber: | 60–90 parts |
| urea-formaldehyde resin | 10–35 parts |
| melamine resin | 3–10 parts |
| food coloring agent | 1–10 parts | wherein the molecular weight of the urea-formaldehyde resin is 300–600.

The plant fiber used in this invention is crop hull or stalk and its amount is preferably in the range of 70 to 80 parts by weight.

In this invention, the molecular weight of the urea formaldehyde resin is 300–600, preferably 300–400. The urea-formaldehyde resin does not contain fluorescent brightening agent or sizing. The urea-formaldehyde resin can be prepared by the following method:

1. Formulation (by Weight and in Parts):

| | |
|---|---|
| urea | 80–100 parts |
| formaldehyde (37%) | 160–240 parts |
| sodium dibutylnaphthalenesulfonate | 5–10 parts |
| Resorcin | 2.5–7.5 parts |
| Glycerol | 16–24 parts |
| pH value conditioner | appropriate amount |

2. Preparation Method:

(1) According to the weight parts mentioned above, add urea, formaldehyde (37%/) and glycerol into a reaction vessel with an agitator and stir them at a 60° C. until the urea is fully dissolved to form a first mixed solution. Cool the first mixed solution to 20–25° C. and add sodium diphenylnaphthalenesulfonate and Resorcin according to the said weight parts. Then stir above mixture for about 10–60 minutes at a rotation speed of 120 rpm to form a second mixed solution.

(2) Adjust the pH value of the second mixed solution to 7–8 with a pH value conditioner, then stir it for 30 minutes at a rotate speed of 180–260 rpm, and stir it for another 30 minutes at a rotate speed of 300–400 rpm to form a third mixed solution. Then pour the third mixed solution into a storage and dry it in the dark for 24 hours to obtain an urea formaldehyde resin base material. Warm and dry the urea-formaldehyde resin base material for 6 hours at 60° C., and then retain the final urea formaldehyde resin for later use.

The pH value conditioner utilized is either oxalic acid, acetic acid or phosphoric acid, preferably oxalic acid.

The amount of the melamine is preferably in the range of 3 to 5 parts by weight.

The food coloring agent of the invention is selected from the group consisting of titanium white, zinc oxide, iron oxide red, pigment yellow 147, pigment blue 15, and combinations thereof. Preferably, it is titanium white. The amount of the food coloring agent is in the range of 3 to 5 parts by weight.

The processing method for manufacturing tableware product using the degradable composite material of the invention comprises the following steps:

(1) pulverize the plant shell or stalk of crops into 60 mesh or over, and then mix the pulverized shell or stalk of crops with urea-formaldehyde resin and melamine resin proportionately and thoroughly to form a mixture of the biodegradable composite material;

(2) feed the mixture of the biodegradable composite material into the concave molding mould positioned in a pushing upward type oil hydraulic press in a fixed quantity and position with temperature of the mould maintained at 125–190° C.;

(3) control the pressure of the oil hydraulic press at between 10–30 Mpa and keep the press operating at 3 intervals by maintaining at above pressure for 3–30 seconds per each interval, so as to obtain the finished products.

Preferably, the grinder is a turbine grinder, and maintain the concave mould temperature at 160° C., the convex mould temperature at 170° C., working pressure at 25 Mpa, keep the press operating at 3 intervals by maintaining at above pressure for 3 seconds per each interval.

The invention will be better understood on reading the following detailed description of non-limiting embodiments of the invention.

DETAILED DESCRIPTION OF THE INVENTION

EXAMPLE 1

The Preparation of Urea-formaldehyde Resin (1) Formulation

| | |
|---|---|
| urea | 20.9 kilogram |
| formaldehyde (37%) | 41.8 liter |
| sodium dibutylnaphthalenesulfonate | 1.57 liter |
| resorcin | 1.05 kilogram |
| glycerol | 4.18 liter |
| oxalic acid | appropriate amount |

(2) Preparation Method:

(1). Add urea, formaldehyde (37%) and glycerol into a reaction vessel with an agitator and stir them at a 60° C. until the urea is fully solved to form a first mixed solution. Cool the first mixed solution to 20–25° C. and add sodium diphenylnaphthalenesulfonate and resorcin according to the said weight parts. Then stir above mixture for about 10–60 minutes at a rotate speed of 120 rpm to form a second mixed solution.

(2). Adjust the pH value of the second mixed solution to 7–8 with oxalic acid, then stir it for 30 minutes at a rotate speed of 180–260 rpm, and stir it for another 30 minutes at a rotate speed of 300–400 rpm to form a third mixed solution. Then pour the third mixed solution into a storage container and dry it in the dark for 24 hours to obtain an urea-formaldehyde resin base material. Warm and dry the urea-formaldehyde resin base material for 6 hours at 60° C., and then to obtain the final urea-formaldehyde resin for later use.

EXAMPLE 2

Manufacture the Degradable Disposable Tableware

Crush the dried crop hull to fines up to 60 mesh by a turbine grinder produced by Hangzhou Chemical Industry Institute for spare.

According to the Formulations listed in table 1, add fine crop hull, urea-formaldehyde resin dry ester (prepared in example 1), melamine resin (produced by Nanjing ally resin factory), and white titanium pigment into an upright blender and stir it for about 15 minutes until it is homogeneous. 5 kinds of degradable composite material can be achieved.

TABLE 1

| Component | Formula 1 (kg) | Formula 2 (kg) | Formula 3 (kg) | Formula 4 (kg) | Formula 5 (kg) |
|---|---|---|---|---|---|
| Crop hull | 19.25 | 15 | 17.5 | 40 | 22.5 |
| Urea-Formaldehyde Resin | 3.75 | 6.75 | 8.75 | 2.5 | |
| Melamine Resin | 1.25 | 0.75 | | 2.25 | 2.5 |
| White Titanium | 0.75 | 2.5 | 6.25 | 0.25 | |

EXAMPLE 3

Manufacture the Degradable Disposable Tableware.

According to the process condition indicated in table 2, make the disposable tableware by the degradable composite material achieved from example 1. Each disposable tableware will use 30 grams of the degradable composite material in the concave mold of the oil hydraulic press.

Compare the capability, appearance and cost of the products, the product made by the degradable composite material from formula 1 is preferable.

TABLE 2

| Process Parameter | Formula 1 | Formula 2 | Formula 3 | Formula 4 | Formula 5 |
|---|---|---|---|---|---|
| Concave Temperature/° C. | 160 | 150 | 140 | 130 | 115 |
| Convex Temperature/° C. | 170 | 160 | 150 | 140 | 125 |
| Pressure/MPa | 25 | 23 | 21 | 19 | 17 |
| Pressure Keeping Period/s | 3 | 10 | 17 | 24 | 30 |
| Pressure Keeping Times/times | 6 | 5 | 4 | 3 | 2 |
| Deflation Time/s | 3 | 5 | 7 | 9 | 12 |
| Deflation Gap/mm | 8 | 8 | 8 | 8 | 8 |

EXAMPLE 4

Test of Evaporated Residues and Fluorescent Material of the Product.

The sample tested was the disposable tableware product produced in example 1 herein using specifically Formula 1 disclosed therein. Standard testing standard GB 5009.60–85 was used. The results are shown in Table 3 below.

TABLE 3

| Test items | Measured value | Normalized value |
|---|---|---|
| n-hexane evaporated residue mg/L | 4.8 | ≦30 |
| 4% acetic acid evaporated residue mg/L | 11.2 | ≦30 |
| 65% alcohol evaporated residue mg/L | 3.8 | ≦30 |
| Fluorescent test (254 nm and 365 nm) | Qualified | ≦5 cm$^2$/100 cm$^2$ |

As shown in Table 3, it was indicated that the result of evaporated residues and fluorescent test could reach the requirements of related test standards.

EXAMPLE 5

Biodegradability Experiments of the Product

1. Sample: The Disposable Tableware Produced by Formula 1 of Example 1

2. Biodegradability Experiments (Designed Referring to U.S. ASTM Methods)

(1). Bacterial Strains:

*Aspergillus niger* B1

*Trichoderma reesai* 9414

Trichoderma sp. 108

Gibberella sp. ST-3

Pseudomonas sp. 29

*Bacillus cereus* 45

His Bacillus sp. W31

(2). Culture Medium:

A. Czapek medium:

$NH_4NO_3$ 2 g, $K_2HPO_4$ 1 g, $MgSO_4 \cdot 7H_2O$ 0.5 g, KCl 0.5 g, $FeSO_4 \cdot 7H_2O$ 0.01 g, Agar 15 g, Fine experiment material 30 g, $H_2O$ 1000 ml pH 6 (used for fungi) pH 7 (used for bacteria)

B. Broth Bouillon Medium:

| Bouillon Ointment | 3 g, | Peptone | 10 g, |
| NaCl | 5 g, | Agar | 15 g, |
| $H_2O$ | 1000 ml, | pH | 7.0–7.2. |

3. Method and Result

Measure the growth of fungi by means of a dibbling method: Take the Czapek agar medium which has been mixed with fine experimental material as the carbon source and pour into a 9cm-diameter glass culture plate after having been melted, then mix it lightly to be homogeneous and cool to coagulate. Inoculate some mycelial or spores of the fungi with an inoculating needle in the central part of the culture plate or in a triangle figure. Grow them at a temperature of 28° C. for 10 days and 20 days respectively, and then measure the diameter of every colony as to show its growth. From the result shown below in table 4, all of the four strains of fungi can grow on the Czapek agar medium mixed with experimental material. Although their growth is slow, it still can prove that these fungi can utilize the experiment material as carbon and energy sources to grow.

TABLE 4

| | Scope of Colony (diameter mm) | |
| --- | --- | --- |
| Fungi | 10 days | 20 days |
| Aspergillus niger B1 | 3–4 | 4–5 |
| Trichoderma reesai 9414 | 2 | 3 |
| Trichoderma sp. 108 | 0.8 | 1 |
| Gibberella sp. ST | 0.8 | 1 |

Measure the growth of bacteria by means of a shaking bottle method: Take some bacteria from the fresh bouillon agar slope with an inoculating ring and inoculate them onto 50 ml Czapek agar medium which use experimental material as the carbon source. Put them into a 250 ml conical flask and grow them at 28° C. with a 180 rpm rotate speed shaking. Measure the quantity of live bacteria in the fostering solution at different time by means of a dilution flat method as to show the growth status of the bacteria. From the result shown below in table 5, one can conclude that all the three tested bacteria strains as Pseudomonas sp.29, Bacillus sp. W31, and Bacillus cereus 45 can grow on the Czapek agar medium which use experimental material as the carbon source. After 10 days of growth, the quantity of bacteria was 600–2,500 per ml, and after 20 days of growth, the quantity was up to 40,000–60,000 per ml.

TABLE 5

| | Alive bacteria quantity (per ml) | |
| --- | --- | --- |
| Bacteria | 10 days | 20 days |
| Bacillus sp. W31 | $7 \times 10^2$ | $6 \times 10^4$ |
| Bacillus cereus 45 | $6 \times 10^2$ | $4 \times 10^4$ |
| Pseudomonas sp. 29 | $2.5 \times 10^3$ | $6 \times 10^3$ |

4. Conclusion: The results of the colony diameter and the bacteria growth shown above prove that all the 7 kinds of microorganisms can utilize the experimental material as carbon and energy sources to grow. Therefore the experimental material is a biodegradable product.

EXAMPLE 6

Acute Toxicity Test of the Products of Vegetable Fiber Composite Material of the Invention Sample: Disposable Tableware Produced by Formula 1 of Example 1

Institution in Charge of Detection: State Environment Protection Administration of China, Beijing Institute of Environmental Medicine Testing standard: refer to the requirements of toxicological detection in "Universal technological conditions of railway fast food lunchbox product supply" (TB/2611-94) in Professional Standard of the Ministry of Railways in the People's Republic of China, in which the sample is pretreated as follows: Weigh 30 g of sample and cut the sample into pieces of 0.5 cm×0.5 cm. Put the cut pieces into four sorbitic extractors, then respectively add 300 ml of distilled water, 300 ml of 4% acetic acid, 300 ml of 65% alcohol, and 300 ml of n-hexane into each extractor. Heat each extractor to the boiling points of above four solvents and reflux them for 2 hr, in which the extractor containing water and extractor containing 4% acetic acid were put into paraffin bathes, while the extractor containing 65% alcohol and extractor containing n-hexane were put into water bathes. Mix the four reflux liquids uniformly to form a mixture, and then place above mixture into a rotary evaporator and depressurize and concentrate it at 70–75° C. to obtain a concentrated liquid. Take 100 ml of the concentrated liquid, add 2 g of starch into it, and then heat until it becomes a paste for experimental use.

Testing method: experimental animal was Kunming breed mice weighing 13–22 g each, provided by the Animal Center of Chinese Academy of Medical Sciences.

(1) Trial test: 9 male and female mice randomly divided into three groups separately, 3 mice in each group. Contamination dosages are 20 g/kg, 19 g/kg, 5 g/kg respectively. Once contaminate through gastric lavage via mouth.

(2) Formal test: 40 male and female mice, randomly divided into four groups respectively, 10 animals in each group. According to the results of trial test, contamination dosages are 20 g/kg, 10 g/kg, 5 g/kg, and 2.5 g/kg, once contaminated through gastric lavage via mouth. Fasting for 12 hr before gastric lavage, the maximum volume of dose was 0.4 ml/20 g in body weight. Observe for one week after contamination, record the poisoning symptoms of animals and time of death. If $LD_{50}$ was more than 10 g/kg, it need not be calculated, while if $LD_{50}$ was less than 10 g/kg, determine it through retest using probability unit-graph method.

Experimental Results:

(1) Trial test: no death resulted in the three dosage groups of male and female animals, and no poisoning symptoms could be seen.

(2) Formal test: no death resulted in four dosage groups of male and female animals, and no poisoning symptoms could be seen.

Measured $LD_{50}$ of delivered samples for detection being more than 20 g/kg.

Results: lethal dose of 50% ($LD_{50}$) of above concentrated liquid is more than 20 g/kg, refer to acute toxicity ($LD_{50}$) grade scale, it belongs to actual non-toxic grade.

This invention overcomes the defects of the published patented technologies using shell or stalk of crops as main raw materials for production of disposable tableware, including complicated processes and high production costs. This invention provides a technology featuring a simple formula, lower cost of adhesives, attaining food sanitation standards, single step forming with hot pressing as well as without the need for long time drying and surface coating, yet still can achieve such properties as water, heat and corrosion resistance, anti-freezing, non toxic, pollution free and biodegradable. This invention scientifically and effectively utilizes agricultural waste, a raw material of ample annual supply, and low costs. Further, disposable biodegradable material and its products may be recovered, after their use, to make animal feed or fertilizer after being crushed into power, thus accomplishing the comprehensive utilization of recycled resources. The disposable biodegradable material and its products made with the process provided by this invention have the properties of being of natural color; dense, tough and tensile and constitute entirely new environment protection green products.

In summary, the above embodiments are only for describing the invention but not for limiting the range of the invention. All the changes that do not depart from the spirit of this invention are within the range of this invention.

What I claim is:

1. A degradable composite material, which comprises the following components by weight in parts:

| | |
|---|---|
| plant fiber: | 60–90 parts |
| urea-formaldehyde resin | 10–35 parts |
| melamine resin | 3–10 parts |
| food coloring agent | 1–10 parts | wherein the molecular weight of said urea-formaldehyde resin is 300–600.

2. The degradable composite material according to claim 1, wherein the plant fiber is crop hull or stalk.

3. The degradable composite material according to claim 1, wherein the amount of the plant fiber is in the range of 70 to 80 parts by weight.

4. The degradable composite material according to claim 1, wherein the amount of urea-formaldehyde resin is in the range 10 to 20 parts by weight.

5. The degradable composite material in according to claim 1, wherein the molecular weight of the urea-formaldehyde resin is 300–400.

6. The degradable composite material in according to claim 1, wherein the amount of the food coloring agent is in the range of 3 to 5 parts by weight.

7. The degradable composite material according to claim 1, wherein the food coloring agent is selected from the group consisting of titanium white, zinc oxide, iron oxide red, pigment yellow 147, pigment blue 15, and combinations thereof.

8. The plant fiber composite material according to claim 7, wherein the food coloring agent is titanium white.

9. A plant fiber composite material according to claim 1, wherein the urea-formaldehyde is prepared by following steps:

(1) adding 80–100 weight portions of urea, 160–240 weight portions of formaldehyde (37%) and 16–24 weight portions of glycerol into a reaction vessel with an agital and stir them at a 60° C. until the urea is fully solved to form a first mixed solution, cooling the first mixed solution to 20–25° C. and adding 5–10 weight portions of sodium diphenylnaphthalenesulfonate and 2.5–75 parts by weight of Resorcin, then stirring above mixture for about 10–60 minutes at a rotate speed of 120 rpm to form a second mixed solution; and (2) adjusting the pH value of the second mixed solution to 7–8 with a pH value conditioner, then stirring it for 30 minutes at a rotate speed of 180–260 rpm, and stirring it for another 30 minutes at a rotate speed of 300–400 rpm to form a third mixed solution, pouring the third mixed solution into a storage and drying it in the shade for 24 hours to obtain an urea formaldehyde resin base material, warming and drying the urea formaldehyde resin base material for 6 hours at 60° C., so as to obtain the final urea formaldehyde resin, having a molecular weight of 300–600.

10. The plant fiber composite material according to claim 9, wherein the pH value conditioner is selected from oxalic acid, acetic acid, phosphoric acid, and combinations thereof.

11. The plant fiber composite material according to claim 10, wherein the pH value conditioner is oxalic acid.

12. A plant fiber composite material according to claim 1, which comprises the following by weight in parts:

| | |
|---|---|
| crops shell or stalk powder of 60 mesh | 80 parts |
| urea-formaldehyde resin | 15 parts |
| melamine resin | 5 parts |
| food coloring agent | 3 parts |

13. Tableware products made from degradable composite material according to claim 1 and that are nontoxic, degradable, ecologically benign, and environmentally beneficial, wherein the tableware products are made from a process comprising:

(1) feeding the degradable composite material into a concave molding mould positioned in an operating platform of a pushing-upward-type oil hydraulic press in a fixed quantity and position with temperature of the mould maintained at 125–190° C.; and (2) controlling pressure of the pushing-upward-type oil hydraulic press at between 10–30 Mpa and keeping the press operates at 3 intervals by maintaining at above pressure for 3–30 seconds per each interval, so as to obtain the finished products.

* * * * *